(12) United States Patent
Muddasani et al.

(10) Patent No.: US 11,890,905 B2
(45) Date of Patent: Feb. 6, 2024

(54) TAILGATE HITCH SENSOR SYSTEM

(71) Applicant: Curt Manufacturing, LLC, Eau Claire, WI (US)

(72) Inventors: Praveen Reddy Muddasani, Novi, MI (US); Graham A. Motzing, Eau Claire, WI (US); Joel D. Diller, Eau Claire, WI (US)

(73) Assignee: CURT Manufacturing, LLC, Eau Claire, WI (US)

( * ) Notice: Subject to any disclaimer, the term of this patent is extended or adjusted under 35 U.S.C. 154(b) by 619 days.

(21) Appl. No.: 17/140,296

(22) Filed: Jan. 4, 2021

(65) Prior Publication Data

US 2021/0206218 A1 Jul. 8, 2021

Related U.S. Application Data

(60) Provisional application No. 62/956,411, filed on Jan. 2, 2020.

(51) Int. Cl.
*B60D 1/64* (2006.01)
*B62D 33/027* (2006.01)

(52) U.S. Cl.
CPC ........... *B60D 1/64* (2013.01); *B62D 33/0273* (2013.01)

(58) Field of Classification Search
CPC ... B60D 1/64; B60D 1/58; B60D 1/62; B62D 33/0273; E05F 15/611; E05Y 2400/53; E05Y 2900/544
See application file for complete search history.

(56) References Cited

U.S. PATENT DOCUMENTS

| | | | |
|---|---|---|---|
| 8,201,869 B1 | 6/2012 | Butlin, Jr. et al. | |
| 10,266,092 B2* | 4/2019 | Gardner | B60P 1/16 |
| 2014/0249723 A1* | 9/2014 | Pilutti | B60W 30/00 |
| | | | 701/42 |
| 2019/0315169 A1* | 10/2019 | Rogness | B60D 1/62 |
| 2020/0023696 A1* | 1/2020 | Ling | B60R 1/00 |

OTHER PUBLICATIONS tailgatefix.com, Splitgate Override Switch Installation Instructions, admitted prior art downloaded from www.tailgatefix.com.

* cited by examiner

*Primary Examiner* — Jean F Duverne
(74) *Attorney, Agent, or Firm* — Shewchuk IP Services, LLC; Jeffrey D. Shewchuk

(57) ABSTRACT

A tailgate hitch sensor system is installed by mounting a housing around the end of a receiver tube on the back of a hitch, and then plugging the system into both the OEM passenger side tailgate locking mechanism and the OEM driver side tailgate locking mechanism. A magnetically operated reed switch is positioned at the top of the housing, and a cover supporting a magnet is pivotally hinged to the housing so the cover has a normally closed position covering the receiver tube. When the cover is closed, the tailgate operates normally. When the cover is open, the electrical circuit for at least one stage of lowering the tailgate is de-activated.

20 Claims, 6 Drawing Sheets

TAILGATE HITCH SENSOR SYSTEM

CROSS-REFERENCE TO RELATED APPLICATION(S)

The present application claims the benefit of U.S. provisional patent application Ser. No. 62/956,411, filed Jan. 2, 2020, entitled "Tailgate Hitch Sensor". The contents of U.S. provisional patent application Ser. No. 62/956,411 are hereby incorporated by reference in entirety.

BACKGROUND OF THE INVENTION

The present application relates to ball mount hitches used on the backs of vehicles such as pickup trucks, underneath a tailgate. Such tailgates commonly move between an upright position where they provide a vertical wall defining the back of the vehicle bed, to a lowered position to allow better access for moving things into and out of the vehicle bed. Historically, the lowered position of the tailgate is generally horizontal, at an elevation generally equal to the floor of the vehicle bed. More recently, other and more varied tailgate solutions have become common. For instance, "MULTI PRO" tailgates from General Motors allow a portion of the tailgate to be further lowered, vertically downward below the elevation of the vehicle bed, perhaps then also including a step below the elevation of the vehicle bed to further facilitate ingress and egress to and from the vehicle bed.

FIG. 1 is a reproduction of FIG. 4 from U.S. Pat. No. 8,201,869, incorporated by reference, which shows the staged stage lowering of such a MULTI PRO tailgate. With such tailgates, the lowered position of the tailgate shown in FIG. 1 comes quite close to the vertical rear face of the rear bumper of the vehicle. Depending upon the design of a hitch secured to allow a ball mount to be used through or under the rear bumper of the vehicle, the ball mount (when used) can interfere with certain lowered positions of the tailgate.

If a ball mount were to be inserted into the receiver opening of this hitch prior to lowering of the tailgate, the ball mount would occupy this same location of the lowered tailgate, and lowering of the tailgate would cause the tailgate to contact the ball mount. At a minimum, such contact prevents use of the step function of the tailgate. Further, such contact can cause damage to the ball mount or to the hitch, or, more likely, to the tailgate. Such damage is inconvenient and expensive to fix.

One existing solution (in "automatic" and "manual" versions) for such problems has been shown at www.tailgatefix.com. The "automatic" TAILGATEFIX option is based on the presence of the hitch pin, while the "manual" TAILGATEFIX option is based on a push button switch. The TAILGATEFIX products include poor mounting and wiring options and limited functionality. Better solutions to avoid such tailgate-ball mount interference problems are needed.

SUMMARY OF THE INVENTION

The present invention is a tailgate hitch sensor system and a method of installing the tailgate hitch sensor system on a truck having a tailgate. In one aspect, the system includes a sensor or switch which is actuated based upon movement of a cover for a receiver tube of a hitch. When the cover is closed, the tailgate operates normally. When the cover is open (as it must be to insert a ball mount or other towed accessory into the receiver tube), the electrical circuit for at least one stage of lowering the tailgate is de-activated. In another aspect, the system can merely plug into the electrical system of the truck, and thus can be installed without any cutting or stripping of OEM wiring. For instance, a preferred embodiment plugs into both the OEM passenger side tailgate locking mechanism and the OEM driver side tailgate locking mechanism.

BRIEF DESCRIPTION OF THE DRAWINGS

The present invention is described with reference to the attached drawing sheets, in which.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
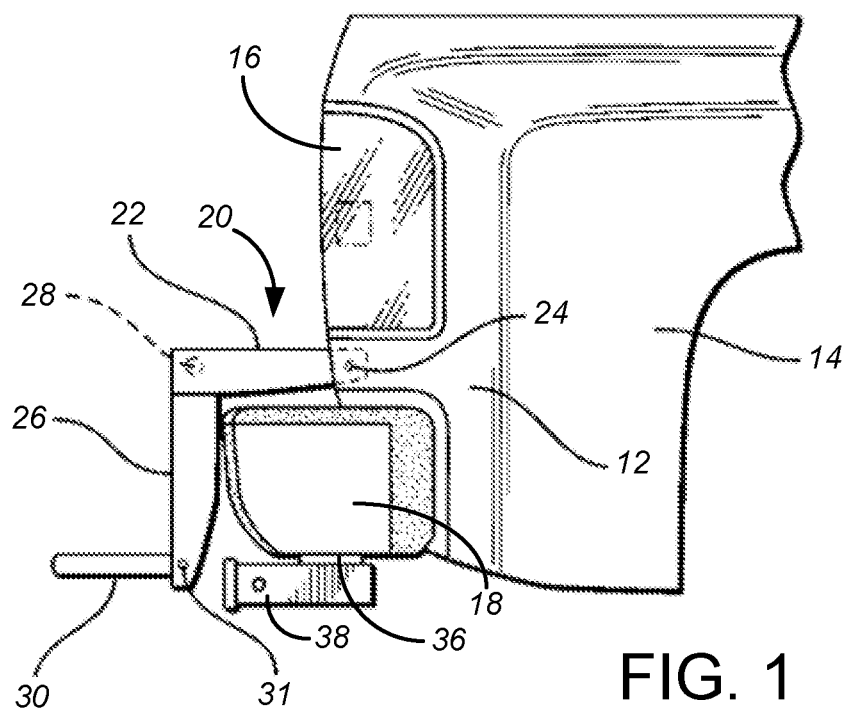
FIG. 1 is a fragmentary side view of a pickup truck, with its tailgate in a lowered position providing a step configuration for easy access to the cargo space within the pickup truck bed, but with the step occupying the space immediately behind the receiver hitch opening.

FIG. 1 shows a side view of a pickup truck 12 manufactured by an Original Equipment Manufacturer ("OEM"), including a sidewall 14 and a taillight 16, with the taillight 16 being over a rear bumper 18. While the present invention could alternatively be provided as part of the OEM wiring, the preferred embodiment of the present invention is an aftermarket part, configured to be readily usable by installation into an OEM truck 12.

The pickup truck 12 has a pickup bed as well known, the rear wall of which is provided by a lowerable tailgate 20. A first portion 22 of the tailgate 20 is hingedly connected to the sidewall 14 for pivoting about the hinge point 24. A second portion 26 of the tailgate 20 is hingedly connected to the first portion 22 for pivoting about the hinge point 28, such as in a second stage of lowering. A step 30 is hingedly connected to the second portion 26 for pivoting about the hinge point 31, either with or after second stage lowering.

In the preferred pickup trucks, the raising and lowering of the tailgate 20 can be accomplished electronically, such as from buttons within the cab (not shown) of the truck 12, on a key fob (not shown), and/or on the tailgate 20 (such as with the tailgate latch handle, not shown) itself. The OEM electronic tailgate system includes two cables 32 (shown only in FIG. 8) including four wires each, which plug into an inner tailgate panel locking mechanism 34 (shown only in FIG. 8) on both the passenger side and driver side of the vehicle 12. The inner tailgate panel locking mechanism 34 is what attaches or releases the second portion 26 in line with the first portion 22 of the tailgate 20. A hitch 36 is mounted to the pickup truck 12, with a receiver tube 38 having a receiver tube opening exposed on the back of the truck 12 underneath the rear bumper 18.

The purpose of the present invention is to electrically disable or prevent lowering of the tailgate 20 if a ball mount (not shown) or other accessory (not shown) is mounted in the receiver tube 38 of the hitch 36, and thereby avoid the possibility of contact damage both to the ball mount/accessory and to the tailgate 20. The system 40 includes a sensor which detects the presence of a ball mount in the receiver tube 38 of the hitch 36. When a ball mount or other accessory is present, certain lowering operations of the tailgate 20 are restricted or disabled, while certain other functions of the tailgate 20 remain operative. For instance, the controller may disable lowering of the second stage of the MULTI PRO tailgate 20. The preferred embodiments will sense not only a ball mount, but also the presence of other hitch mounted accessories (adapter, cargo basket, bike carrier) in the receiver tube 38 to interrupt or modify the signal to the tailgate 20 to release.

Figure 2:
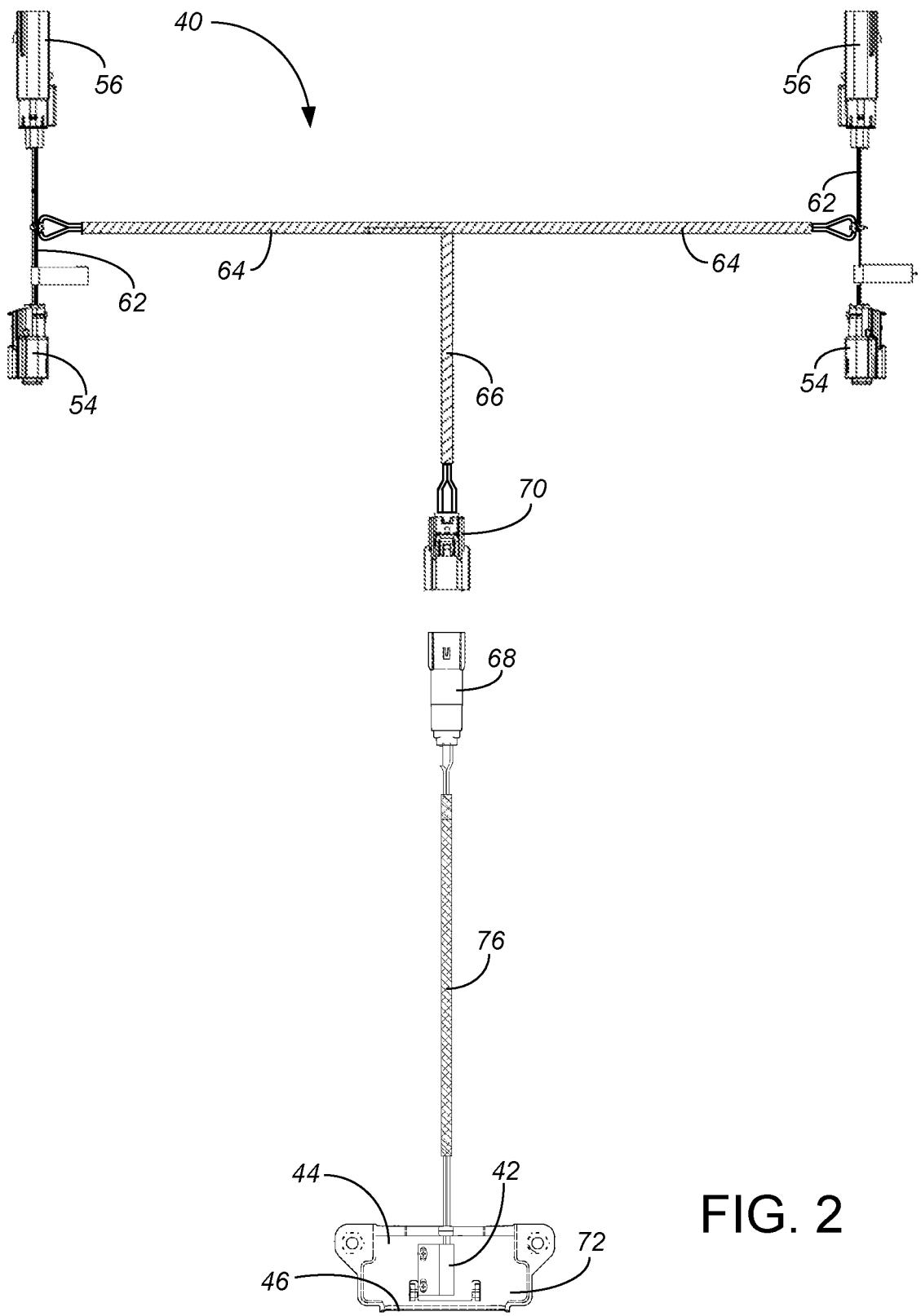
FIG. 2 is a top plan view of the tailgate hitch sensor system of the present invention prior to installation.
Figure 3:
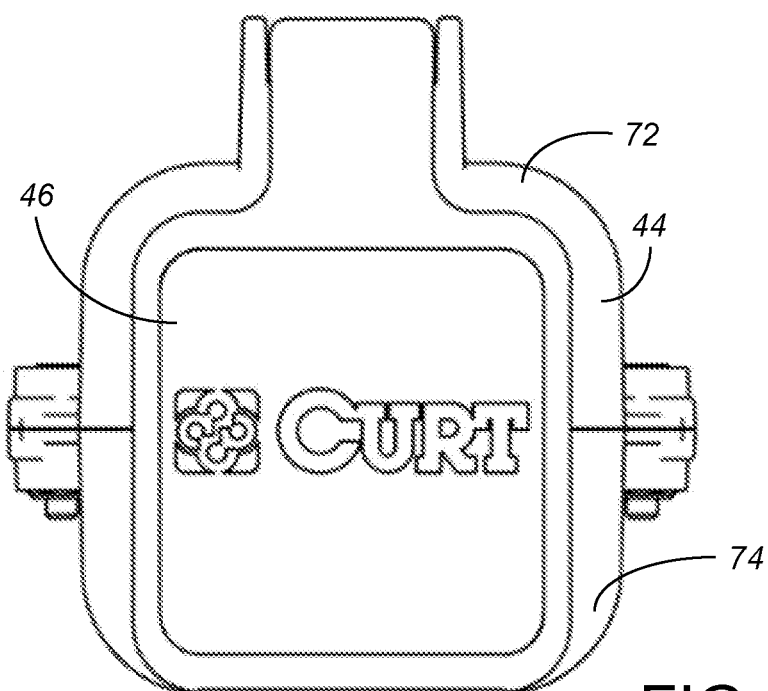
FIG. 3 is a rear elevation view of the housing assembly and receiver opening cover shown in FIG. 2, in which "rear" is taken from the orientation of the vehicle, i.e., "rear" is from behind the vehicle and looking forward.
Figure 7:
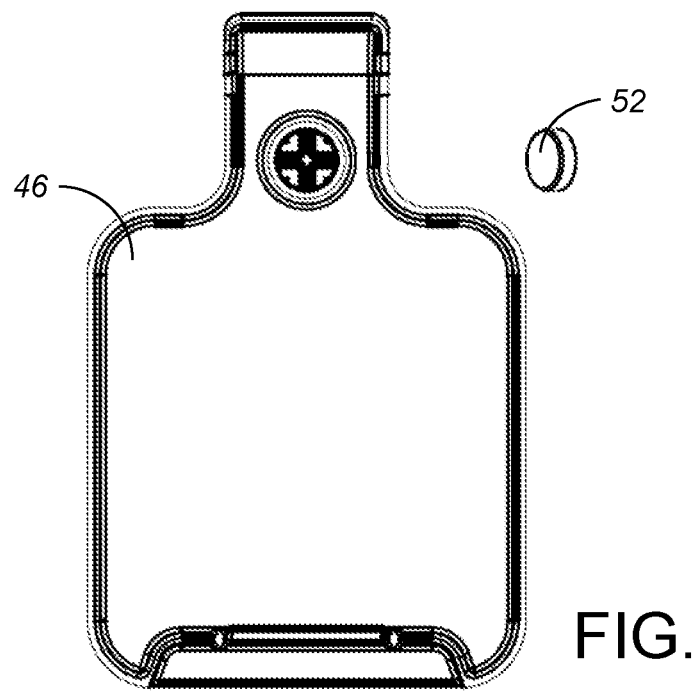
FIG. 7 is a front exploded elevation view of the receiver opening cover of FIGS. 3-5.
Figures 4, 5:
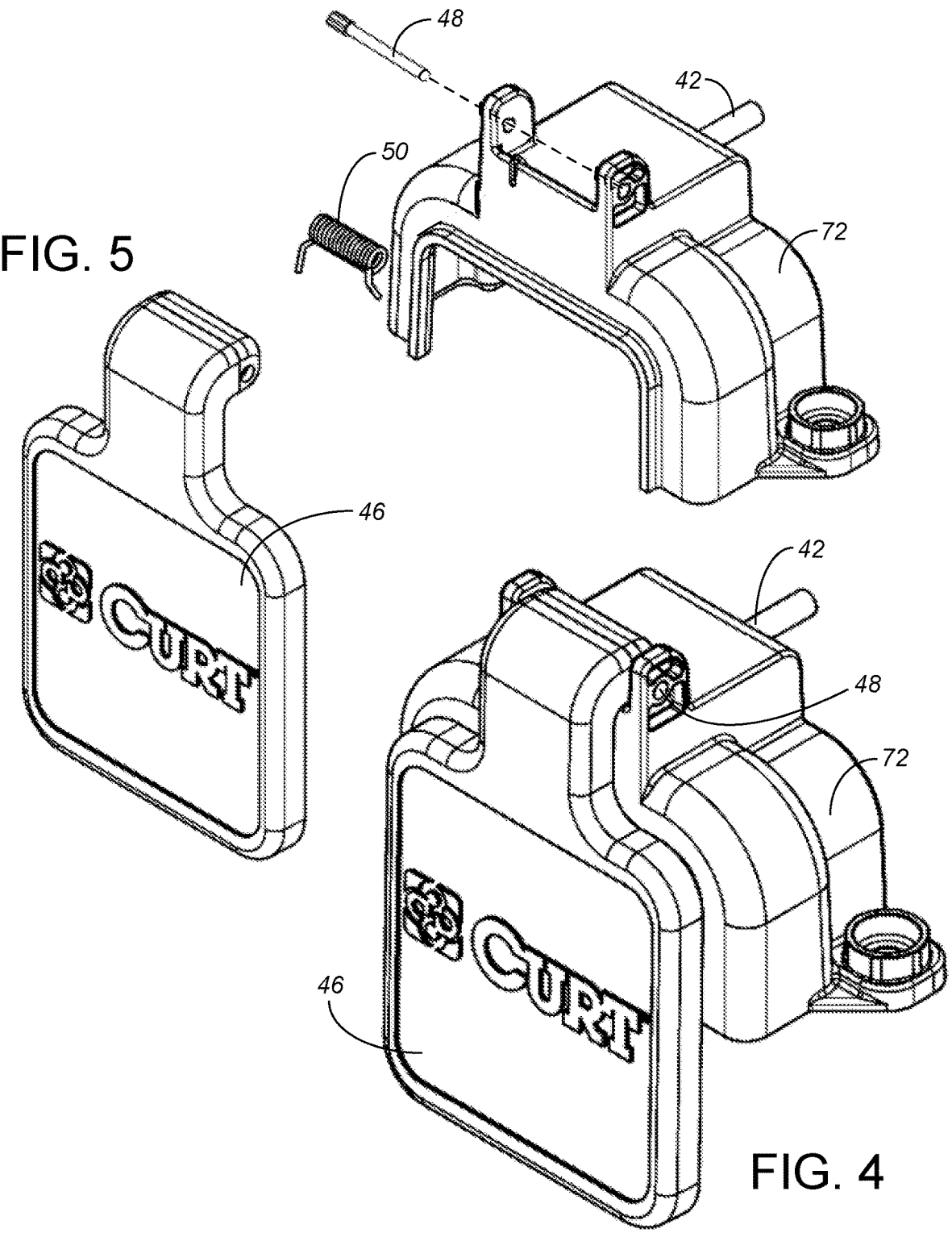
FIG. 4 is a rear perspective view of the top housing assembly and receiver opening cover shown in FIG. 2.
FIG. 5 is an exploded view of FIG. 4.
Figure 6:
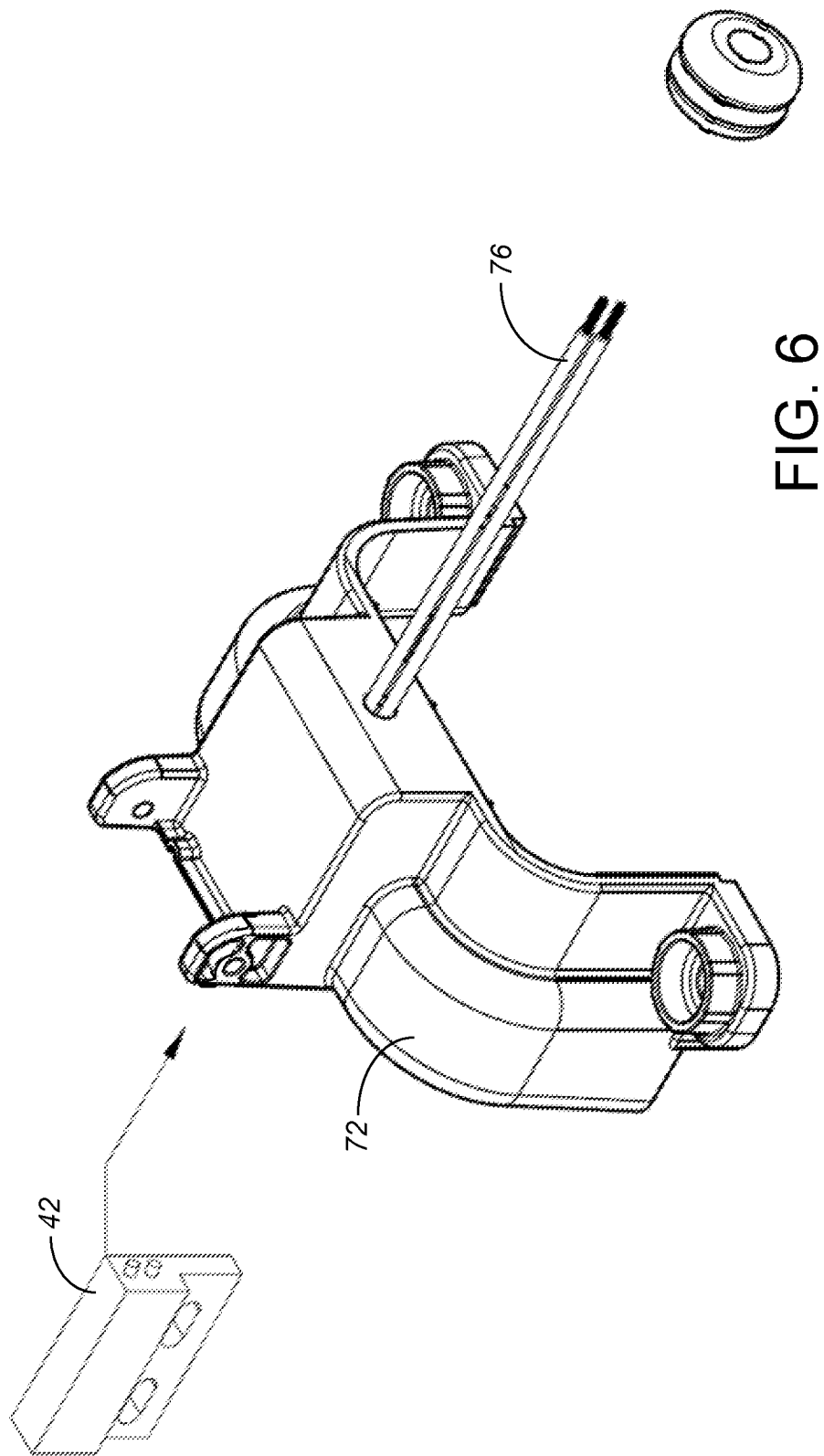
FIG. 6 is a front exploded perspective view of the top housing of FIGS. 4 and 5.

A preferred tailgate hitch sensor system 40 in accordance with the present invention is shown in FIG. 2. The electronically active component is a switch 42 or sensor which is mounted relative to the receiver tube opening. The most preferred way to mount the electronically active component is by including it in a housing 44 which encircles the end of the receiver tube 38. The receiver tube 38 has a standardized internal size (such as 2×2 inches, but alternative sizes of 1.25×1.25 inches and 2.5×2.5 inches are also in relatively common use), and the external end of the receiver tube 38 is an exposed, accessible location with a fairly consistent size (such as exterior dimensions of about 3×3 inches for a 2×2 inch interior) for near universal mounting. Alternative embodiments mount the switch or sensor at the front of the hitch receiver tube 38, in the center of the hitch receiver tube 38, or on the bumper 18. The preferred controller has a housing and mounting shape and hardware consistent with the mounting location option selected.

In some embodiments, the switch is a normally closed mechanical switch element, positioned within the receiver tube 38, such as on a spring so as to be engaged (opened) when a ball mount or other accessory is inserted into the receiver tube 38 and makes contact with the switch mechanism. Other embodiments include non-contact sensors such as a laser sensor or photoelectric sensor, mounted on the back of the receiver tube 38 and facing forwardly, which can see when a structure fills the receiver tube 38.

The preferred embodiments, however, instead of sensing or switching when an object is present within the receiver tube 38, instead are actuated based upon movement of a cover 46 for the receiver tube 38. The most preferred embodiment includes a cover 46 which pivots about a pivot hinge 48 and is biased closed by a spring 50. If the cover 46 is closed, the switch 42 is closed. When the cover 46 is opened, the switch 42 is opened.

While a mechanical switch could be associated to switch upon opening or closing of the receiver tube cover 46, the preferred embodiment includes a non-contact switch 42 to reduce the possibility of wear and increase longevity and reliability of the tailgate hitch sensor system 40. The most preferred switch is a normally-open magnetically controlled reed switch 42, activated by a magnet 52 in the cover 46. The cover 46 is preferably formed of molded plastic. For a cover 46 which hinges at top, a preferred location for the switch 42 is immediately on top of the receiver tube 38, centered about 0.5 inches below the pivot hinge axis for the cover 46. With the cover 46 closed, the magnet 52 closes the reed switch 42. Opening of the cover 46 moves the magnet 52 only just over half an inch but also reorients the magnetic field of the magnet 52, allowing the magnetically controlled reed switch 42 to open.

For instance, a model 59145 flange mount reed sensor available from Littlefuse, Inc. of Chicago, Illinois can be used for the switch 42. This reed sensor 42 has hermetically sealed, magnetically operated contacts which continue to operate long after optical and other technologies could fail due to contamination from dirt or corrosion. The reed sensor 42 has no standby power requirement, and operates through non-ferrous materials such as wood, plastic or aluminum. The preferred magnet 52 is an AlNiCo-5 disc or button permanent magnet rated at 11,000 Gauss, 620 Oersted, about 0.5 inches in diameter and 0.125 inches thick. The magnet 52 is positioned in a circular recess in the cover 46 and held in place such as with LOCTITE 3364 epoxy. Numerous other mounting arrangements for the magnet 52 and switch 42 are alternatively possible.

The preferred system does not require any cutting or stripping of OEM wires, but instead merely includes a plug 54 and receptacle 56 which mimics a plug 58 (shown only in FIG. 8) and receptacle 60 (a/k/a "socket", shown only in FIG. 8) already within the pickup truck 12 that carries the relevant signal for opening the tailgate 20. The preferred embodiment controls the mechanical operation (second stage lowering) of the tailgate 20 based on a signal from a proximity sensor (or other switch) which assesses whether a ball mount is present or absent. Which signal and plug design is relevant necessarily depends upon the OEM tailgate and wiring. In the current vehicles which carry the MULTI PRO tailgates, the closest plug/receptacle to the receiver tube 38 carrying the second stage lowering signal is where the OEM wiring connects in to the inner tailgate panel locking mechanism 34, both on the passenger side and the driver side of the tailgate 20. In the OEM wiring scheme, this location includes four wires connected, only the third of which is the electrical second-stage movement signal. The preferred system for this vehicle therefore includes three pass through wires (directly connecting pins 1, 2 and 4 of the plugs 54, 56, 58, 60), with only the signal through pin 3 of the plug 54 and receptacle 56 fed through the reed switch 42. In the preferred embodiment, the three pass-through wires are about 4 inches long, i.e., only about 4 inches of cabling 62 is provided between the male and female plug ends 54, 56. Alternatively, plug 54 and receptacle 56 could be formed integrally together without the 4 inch length of wiring 62, as a single piece of plastic that both plugs into inner tailgate panel locking mechanism 34 and receives the OEM plug 58. Because the OEM wiring can be fairly tight, the cabling 62 makes installation go more smoothly by providing sufficient additional length of wiring without too much excess.

To bridge the distance between the inner tailgate panel locking mechanisms 34 and the receiver tube 38, about 88 inches of cabling 64 is provided between the passenger side cabling 62 and the driver side cabling 62, 44 inches on each side of center cabling 66. The center cabling 66 then extends for about 56 inches to the reed switch 42.

In the preferred OEM vehicles, the third wire to both the passenger side inner tailgate panel locking mechanism 34 and the third wire to the driver side inner tailgate panel locking mechanism 34 are always operated simultaneously. The preferred tailgate hitch sensor system 40 connects the third passenger side and driver side wires at the beginning of the center cabling 66.

The preferred embodiment does not interfere with operation of the taillight 16. With the cover 46 either opened or closed, the truck's taillights 16 will flash upon the tailgate lowering signal, i.e., whenever the tailgate lowering latch or button or key fob button or cab button is pushed. This flashing operation of the taillight 16 is preferably entirely determined by the OEM.

The preferred system includes an internal plug/receptacle 68, 70 merely for ease of assembly into the vehicle 12. For instance, an automotive connector male plug 68 and female receptacle 70, with housings formed of a modified polystyrene alloy resin material to seal two interior electrical contacts, available from Molex LLC of Lisle, Illinois, can be used for the internal plug 68, 70.

If desired, the system 40 can include a manual override switch (not shown), such as a push button, which can be controlled by the user to override the logic running off the proximity sensor information. For instance, a normally open push button switch could be added on top of the housing top portion 72, in parallel with the reed switch 42. The manual override switch would enable the user to lower the second stage tailgate even with the cover 46 open. The preferred system 40 omits the manual override switch to reduce cost.

If desired, the system 40 can also include an LED indicator output (not shown), visible to the user to determine when the system disables or enables the mechanical operation (second stage lowering) of the tailgate 20. The LED indicator output may additionally (such as through a different blinking pattern or different color output) or alternatively visually indicate when the system is outputting a movement signal for the tailgate motion. The preferred system 40 omits the LED indicator output to reduce cost.

Other embodiments of the present invention could avoid any wiring, such as by wireless transmission of the sensor signal to a different point within the vehicle 12 that can control the tailgate lowering signal. For instance, the tailgate configuration for some vehicles may be controlled electronically in a body control module ("BCM", not shown) of the vehicle 12. The BCM may be referred to as an electric control unit ("ECU"), or alternatively the tailgate operation may be controlled in a different ECU. An electronic switch of the vehicle 12, such as associated with a tailgate latch handle, enables the user to control raising or lowering of the tailgate 20. The BCM provides a signal which controls a power module (not shown), which provides power to move the entirety or at least part of the tailgate 20, such as through tailgate latch actuator (solenoid or electric motor) operation, but alternatively through hydraulic or other power delivery to the mechanical structure of the tailgate 20. The inventive controller of the present invention can be implemented in the electrical system either between the switch and the BCM or between the BCM and the power module. Other, more complicated logic may be used if the location that receives the sensor signal also knows other state information about the vehicle. For instance, some embodiments are implemented within a controller and operate differently based on whether the vehicle ignition switch is on or off.

The preferred installation process begins with assembling the housing 44 around the receiver tube opening. The top half 72 is placed over the top of the receiver tube 38 and the bottom half 74 is placed around the bottom of the receiver tube 38. The top and bottom halves 72, 74 fit together to enclose around the receiver tube 38. The two halves 72, 74 can be secured together around the receiver tube 38 using bolts or screws (not shown) extending through the bosses and tightened down with nuts (not shown).

The sensor wiring harness 76 is routed and secured in place, preferably so its socket end 70 is within the tailgate 20. For instance, the sensor wiring harness 76 can be routed from the housing 44 toward the passenger side until just after the bend in the trailer hitch main body 36, then between the bumper 18 and the trailer hitch 36 and above the spare tire (not shown) and into a hole near the base of the tailgate 20. The sensor wiring harness 76 can be zip tied in place so the wiring does not hang below the vehicle 12.

Figure 8:
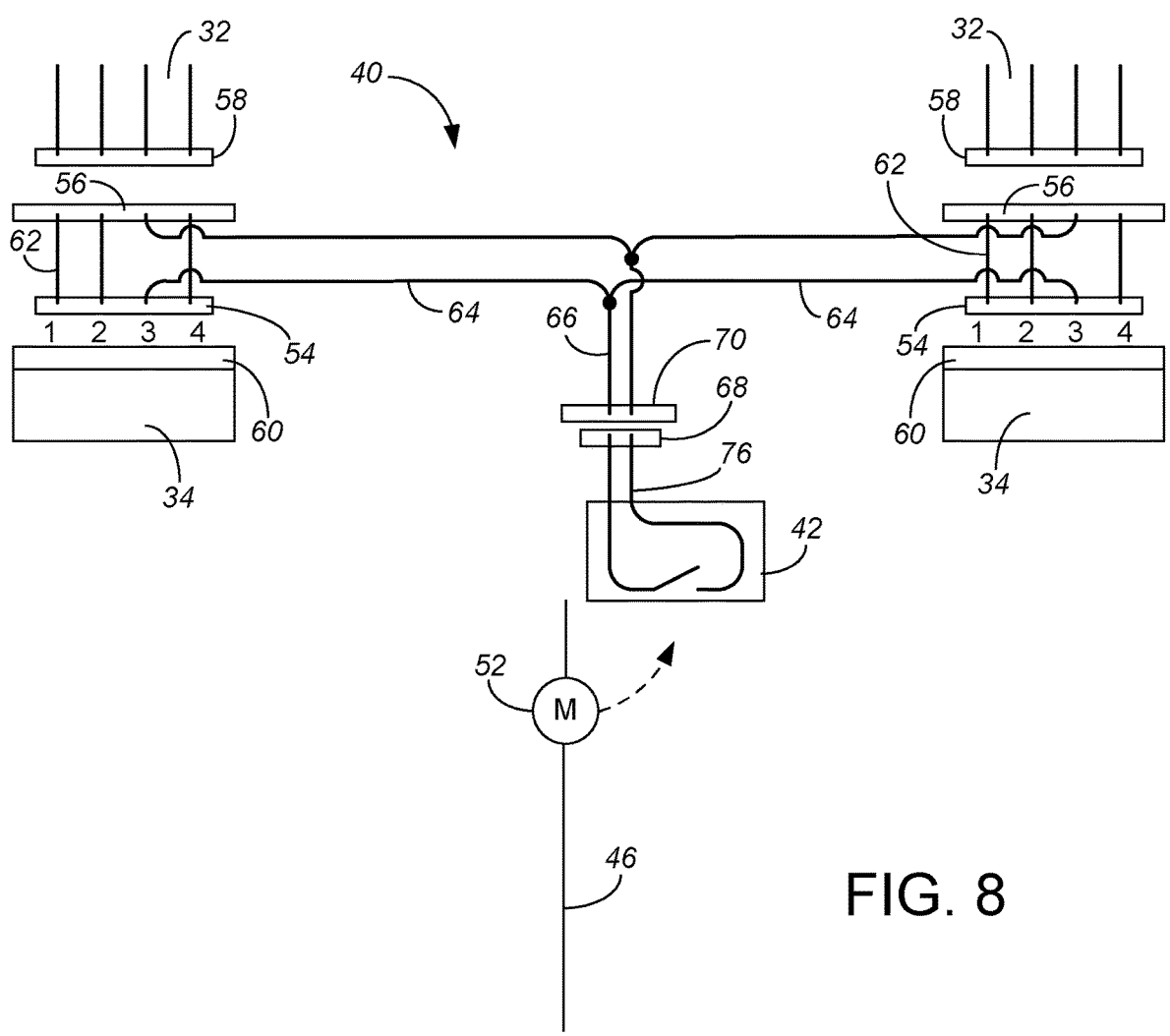
FIG. 8 is an electrical schematic showing the tailgate hitch sensor system of the present invention and how it fits into one type of OEM vehicle wiring.

With the tailgate portions in a lowered position, the inner plastic cover (not separately shown) on the first portion 22 of the tailgate 20 can be removed, exposing wiring for the tailgate 20 and exposing access holes in the first tailgate portion 22 for the outer (main) tailgate locking mechanism (not shown) and for the inner tailgate panel locking mechanism 34 (shown only in FIG. 8). By removing the bolts for the inner tailgate panel locking mechanism 34 and by separating connectors for the outer (main) tailgate locking mechanism (not shown) and for the inner tailgate panel locking mechanism 34, the wiring plug 58 for the inner tailgate panel locking mechanism 34 can be unplugged. The plug ends 56, 54 of the wiring harness can then be plugged into both the male and female OEM plug ends 58, 60 of the inner tailgate panel locking mechanism 34, i.e., between the inner locking mechanism 34 and the OEM wiring 32 which runs under the inner plastic cover. The plug 68 for the sensor wiring harness 76 can then be plugged into the plug 70 for the wiring harness, with all the remaining wiring secured to OEM wiring, such as by zip ties. After the tailgate hitch sensor system 40 has been fully plugged in (all six plugs 54, 56, 68, 70), the outer (main) tailgate locking mechanism and the inner tailgate panel locking mechanism 34 are mechanically reattached, as is the inner plastic cover on the first portion 22 of the tailgate 20. Both the OEM wiring and the wiring of the tailgate hitch sensor system 40 becomes then hidden by the inner plastic cover on the first portion 22 of the tailgate 20.

The tailgate hitch sensor system 40 of the present invention thus prevents deployment of the inner tailgate 26 whenever a ball mount or other accessory is installed into the receiver tube 38 of the hitch 36. Installation is easy, requiring no wire cutting or splicing. No extra electronic components or batteries are required. The tailgate hitch sensor system 40 does not interfere with trailer or other towing accessories. The design is very durable, for years or decades of use even in dirty or corrosive conditions. The system 40 itself is low in cost, and helps avoid potentially expensive tailgate damage.

Although the present invention has been described with reference to preferred embodiments, workers skilled in the art will recognize that changes may be made in form and detail without departing from the spirit and scope of the invention.

What is claimed is:
1. A tailgate hitch sensor system comprising:
  a cover for a receiver tube of a hitch attached at the rear of a truck having a bed with a tailgate, the tailgate being movable from an upright position to at least one downward position, the cover being movable between a closed position where the cover extends over a rear opening into the receiver tube and an opened position where the rear opening into the receiver tube is exposed;

a switch which changes connection state based upon movement of the cover between the closed position and the opened position; and an electrical circuit which inactivates movement of the tailgate to the at least one downward position based on the connection state of the switch when the cover is in the opened position.

2. The tailgate hitch sensor system of claim 1, wherein the electrical circuit comprises at least one plug, which mimics a plug of an electrical system of the truck, such that the tailgate hitch sensor system can be installed in the truck by plugging into the electrical system of the truck and without cutting or stripping any wires of the electrical system of the truck.

3. The tailgate hitch sensor system of claim 2, wherein the plug includes multiple contacts, and wherein the electrical circuit includes at least one pass through wire for transmitting an electrical signal within the electrical system of the truck without modification.

4. The tailgate hitch sensor system of claim 3, wherein the electrical circuit includes a passenger side plug and a driver side plug, each of which plug into a tailgate locking mechanism, and each of which transmit a pass through electrical signal without modification.

5. The tailgate hitch sensor system of claim 2, wherein the electrical circuit includes a passenger side plug and a driver side plug.

6. The tailgate hitch sensor system of claim 1, wherein the switch is magnetically actuated.

7. The tailgate hitch sensor system of claim 6, further comprising a magnet disposed for movement with the cover, and wherein the switch is secured using a housing removably mounted around an end of the receiver tube.

8. The tailgate hitch sensor system of claim 7, wherein the cover is pivotally mounted on the housing, with a pivot location for the cover being disposed on a top of the housing and with the switch being disposed on the top of the housing.

9. The tailgate hitch sensor system of claim 1, wherein the switch is secured using a housing removably mounted around an end of the receiver tube, and wherein the cover is pivotally mounted to the housing.

10. The tailgate hitch sensor system of claim 9, wherein the cover is biased toward the closed position by a spring.

11. A tailgate hitch sensor system comprising:

a sensor mounted adjacent a receiver tube of a hitch attached at the rear of a truck having a bed with a tailgate, the tailgate being movable from an upright position to at least one downward position, the sensor being able to assess an indication of when the receiver tube is in use; and an electrical circuit which inactivates movement of the tailgate to the at least one downward position based on the sensor, the electrical circuit comprising at least one plug, which matches a plug of an electrical system of the truck, such that the tailgate hitch sensor system can be installed in the truck by plugging into the electrical system of the truck and without cutting or stripping any wires of the electrical system of the truck.

12. The tailgate hitch sensor system of claim 11, wherein the plug includes multiple contacts, and wherein the electrical circuit includes at least one pass through wire for transmitting an electrical signal within the electrical system of the truck without modification.

13. The tailgate hitch sensor system of claim 12, wherein the electrical circuit includes a passenger side plug and a driver side plug, each of which plug into a tailgate locking mechanism, and each of which transmit a pass through electrical signal without modification.

14. The tailgate hitch sensor system of claim 11, wherein the electrical circuit includes a passenger side plug and a driver side plug.

15. The tailgate hitch sensor system of claim 11, wherein the sensor is a switch which changes connection state between a closed state and an opened state without contact within the receiver tube.

16. A method of installing a tailgate hitch sensor system, comprising:

mounting a sensor adjacent a receiver tube of a hitch attached at the rear of a truck having a bed with a tailgate, the tailgate being movable from an upright position to at least one downward position, the sensor being able to assess an indication of when the receiver tube is in use, the sensor being part of a tailgate hitch sensor system including an electrical circuit; and plugging a plug of the electrical circuit into an electrical system of the truck without cutting or stripping any wires of the electrical system of the truck, such that the tailgate hitch sensor system inactivates movement of the tailgate to the at least one downward position based on the sensor.

17. The method of claim 16, wherein the act of mounting a sensor adjacent a receiver tube comprises securing a top portion of a housing to a bottom portion of the housing around an end of the receiver tube.

18. The method of claim 16, further comprising:

prior to the plugging act, disconnecting a plug of the electrical system of the truck from a socket of the electrical system of the truck; and before or after plugging the plug of the tailgate hitch sensor system into the socket of the electrical system of the truck, plugging the plug of the electrical system of the truck into a socket of the tailgate hitch sensor system.

19. The method of claim 16, further comprising:

plugging a first portion of the electrical circuit of the tailgate hitch sensor system into a second portion of the electrical circuit of the tailgate hitch sensor system, in situ relative to the tailgate of the truck.

20. The method of claim 19, wherein at least a portion of the electrical circuit of the tailgate hitch sensor system is installed to a position within the tailgate of the truck.

\* \* \* \* \*